US009804252B2

(12) United States Patent
Yagcioglu et al.

(10) Patent No.: US 9,804,252 B2
(45) Date of Patent: Oct. 31, 2017

(54) SYSTEM AND METHOD FOR MEASURING TRACKER SYSTEM ACCURACY

(75) Inventors: Mustafa Yagcioglu, Ankara (TR); Erkan Yavuz, Ankara (TR); Ozgur Yilmaz, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 681 days.

(21) Appl. No.: 14/373,028

(22) PCT Filed: Jan. 17, 2012

(86) PCT No.: PCT/IB2012/050216
§ 371 (c)(1),
(2), (4) Date: Aug. 27, 2014

(87) PCT Pub. No.: WO2013/108075
PCT Pub. Date: Jul. 25, 2013

(65) Prior Publication Data
US 2014/0368664 A1    Dec. 18, 2014

(51) Int. Cl.
*G01S 3/78* (2006.01)
*G01S 3/786* (2006.01)
(Continued)

(52) U.S. Cl.
CPC ............ *G01S 3/7864* (2013.01); *G01S 5/163* (2013.01); *G06F 3/012* (2013.01); *G06F 3/0325* (2013.01); *H04N 17/002* (2013.01)

(58) Field of Classification Search
None
See application file for complete search history.

(56) References Cited

U.S. PATENT DOCUMENTS

| 5,274,360 A | 12/1993 | Watanabe et al. |
| 2002/0044204 A1 | 4/2002 | Zurl |

(Continued)

FOREIGN PATENT DOCUMENTS

EP    1600726 A2    11/2005

OTHER PUBLICATIONS

Yanagihara Y et al: "A spatial position tracker for work-site teaching of sensor-enhanced robotic systems", Robot and Human Communication, 1997, RO-MAN '97, Proceedings., 6th.
(Continued)

*Primary Examiner* — Eileen Adams
(74) *Attorney, Agent, or Firm* — Gokalp Bayramoglu

(57) ABSTRACT

The present invention relates to a simple and effective system and method for measuring camera based tracker system accuracy, especially for a helmet-mounted tracker system, utilizing Coordinate Measuring Machine (CMM). The method comprises the steps of; computing spatial relation between tracked object and calibration pattern using CMM; computing relation between reference camera and tracker camera; computing relation between reference camera and calibration pattern; computing ground truth relation between tracker camera and tracked object; obtaining actual tracker system results; comparing these results with the ground truth relations and finding accuracy of the tracker system; recording accuracy results; testing if the accuracy results is a new calculation required. The system comprises; a reference camera; a calibration pattern visible by reference camera; a camera spatial relation computation unit; a relative spatial relation computation unit a memory unit; a spatial relation comparison unit.

22 Claims, 2 Drawing Sheets

(51) Int. Cl.
*G01S 5/16* (2006.01)
*G06F 3/01* (2006.01)
*G06F 3/03* (2006.01)
*H04N 17/00* (2006.01)

(56) References Cited

U.S. PATENT DOCUMENTS

| | | | |
|---|---|---|---|
| 2003/0185434 A1 | 10/2003 | Lee et al. | |
| 2006/0094955 A1 | 5/2006 | Satoh et al. | |
| 2011/0311030 A1* | 12/2011 | Grzeda | A61B 6/4441 378/162 |
| 2012/0086811 A1* | 4/2012 | Chiang | H04N 17/02 348/187 |
| 2013/0138246 A1* | 5/2013 | Gutmann | G05D 1/0231 700/253 |
| 2013/0249907 A1* | 9/2013 | Humphries | G06T 7/0012 345/420 |

OTHER PUBLICATIONS

IEEE International Workshop on Sendai, Japan Sep. 29,-Oct. 1, 1997, New York, NY, USA, IEEE,US, Sep. 29, 1997, pp. 182-186, XP010263196, DOI 10.1109/ROMAN.1997.646978.
ISBN: 978-0-7803-4076-3.
Young Jun Lee et al: "Helmet Tracker System Using Stereo Cameras", SICE-ICCAS 2006 International Joint Conference, IEEE, Piscataway, NJ,USA, Oct. 1, 2006, pp. 3636-3640.
XP031050152, ISBN: 978-89-950038-4-8.

* cited by examiner

SYSTEM AND METHOD FOR MEASURING TRACKER SYSTEM ACCURACY

FIELD OF THE INVENTION

The present invention relates to the field of measuring, testing and methodologies to determine the accuracy of systems optically tracking objects, especially helmet-mounted tracker systems.

BACKGROUND OF THE INVENTION

It is known that there are methods and models to track a three dimensional object in an environment and compute its position and orientation with respect to a predetermined coordinate system. These kinds of tracker systems are used for example in aircrafts to determine the orientation of head of the pilot. Once the orientation is acquired with respect to the coordinate system of say the display devices, then it is possible to generate graphics on these accordingly. There are different methods to track an object in the scene using magnetic, mechanical or optical means. Currently, the spatial relations of objects may also be determined using magnetic sensors or laser beams but this invention relates specifically to systems using camera-based (day-tv, thermal, IR, Time of Flight etc.) trackers.

In one of the optical camera-based systems the pilot wears a helmet with marks or patterns on and at least one tracker camera determines the helmet's position and orientation using coordinate transformation calculations based on these patterns. Computing spatial relation between an object having a tracking pattern, and a camera is therefore, well known in the state of the art. Throughout the document, whenever a spatial relation is mentioned, it should be understood that the relation between an entity's predetermined reference system with respect to the other's is meant. This reference system is generally based on the respective pattern of an object under consideration. Since the position of the tracker camera with respect to the other systems is known (or can be calculated or measured), it is also possible to compute the helmet's spatial relation with the tracker camera's sensor and then with other systems. Computing spatial relation between different identities, given their spatial relation with respect to a known reference frame is also possible with related vector translations and matrix calculations. In the same manner, similar concepts can also be applied to robotic systems to determine the spatial relation of various arms of the robotic product. Nevertheless, a tracker system using a tracker camera tracks an object (say tracked object) and calculates its position and orientation with respect to a known reference frame. Then this relative relation of the tracked object is used for many different purposes. In this context, "tracked object" means an object having a tracking pattern and being tracked by a tracker system. It may be either a helmet as in a helmet-mounted tracker system or any other object.

The patterns used in camera-based tracker systems are either graphical (generally black and white) patterns (passive marker) tracked by visible light cameras or arrays of infrared LEDs (active marker) tracked by infrared cameras. Other arrangements are also possible but the most convenient among them is the one with the infrared LEDs since these systems can work under inappropriate lighting conditions. There are also some problems related to these tracker systems such as calibration or accuracy determination. Calibration and testing of such systems are generally cumbersome, difficult and require complicated equipment. Furthermore, sometimes instead of calibrating the tracker system, it is essential to determine the system's current state's accuracy, In a currently used calibration method, a laser tracker is used to determine the orientation of different objects relative to a reference point in the scene and the system under consideration is arranged so that it is consistent. Although this method results in an accurate calibration, it uses a laser tracker which is an expensive solution when it is only required to determine the current accuracy of the system under consideration.

Another method which is currently used to calibrate a head tracker system uses specially adapted mechanisms to change the positions of the markers on the scene and then configures the tracker system using these data, generating a coordinate system. Again this method is not practical and uses special equipment which makes the process complicated. When it is only necessary to determine the current accuracy of the system, the error of the current system must be deduced.

The current methods are not offering a simple and efficient way of only measuring a tracker system's accuracy while tracking an object. To provide a solution to this problem, a new methodology should be introduced which uses simpler tools and steps.

The Chinese patent document CN101524842, an application in the state of the art, discloses a method calibrating a robot, taking an initial test point as a reference, and establishing a test coordinate system with a laser tracker, tracking curve arc with the laser tracker, and recording position coordinates measured from clockwise direction and counter-clockwise direction.

The Japanese patent document JP2009085806, an application in the state of the art, discloses a method for accurately setting a camera coordinate system and calibrating the head tracker system by moving the optical marker with a stage mechanism and taking measurements.

SUMMARY OF THE INVENTION

An objective of the present invention is to provide a simple and effective methodology to measure a camera based tracker system's accuracy.

DETAILED DESCRIPTION OF THE INVENTION

A system and method realized to fulfil the objective of the present invention is illustrated in the accompanying figures, in which.

Figure 1:
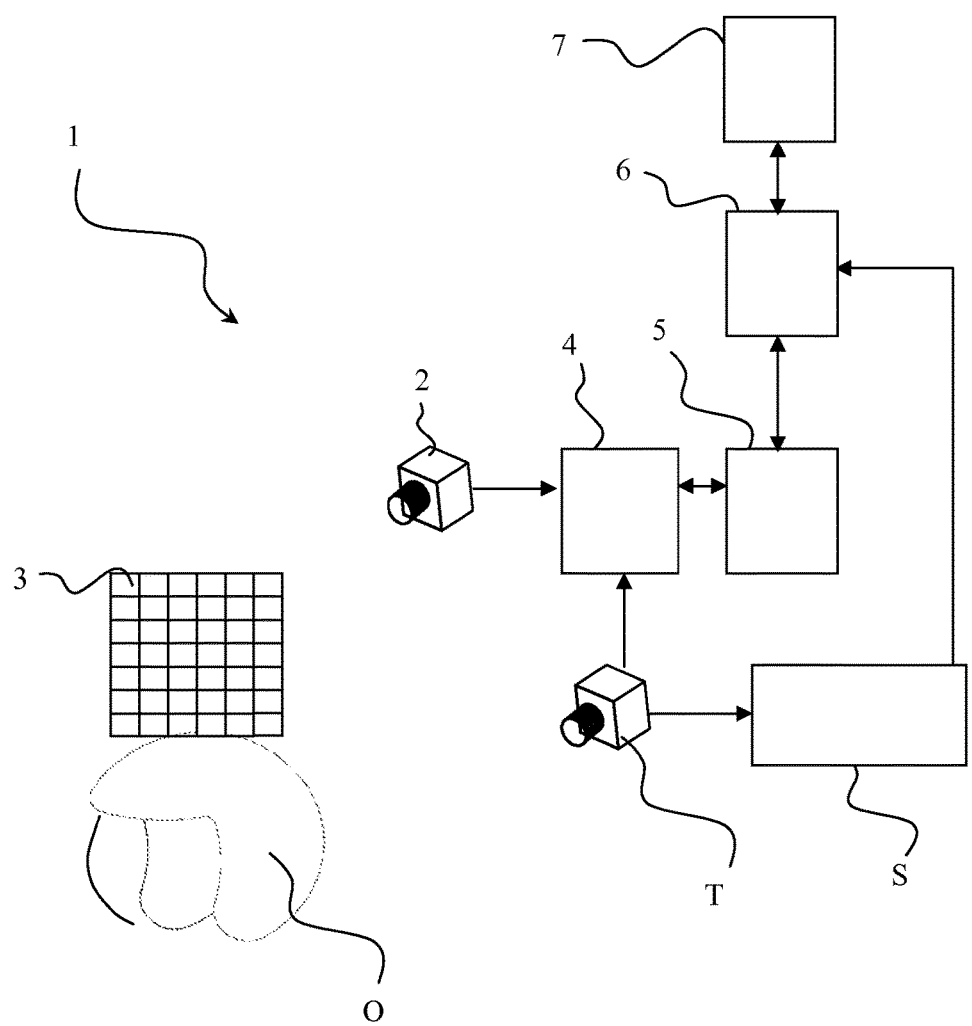
FIG. 1 is the schematic view of the preferred embodiment system.
Figure 2:
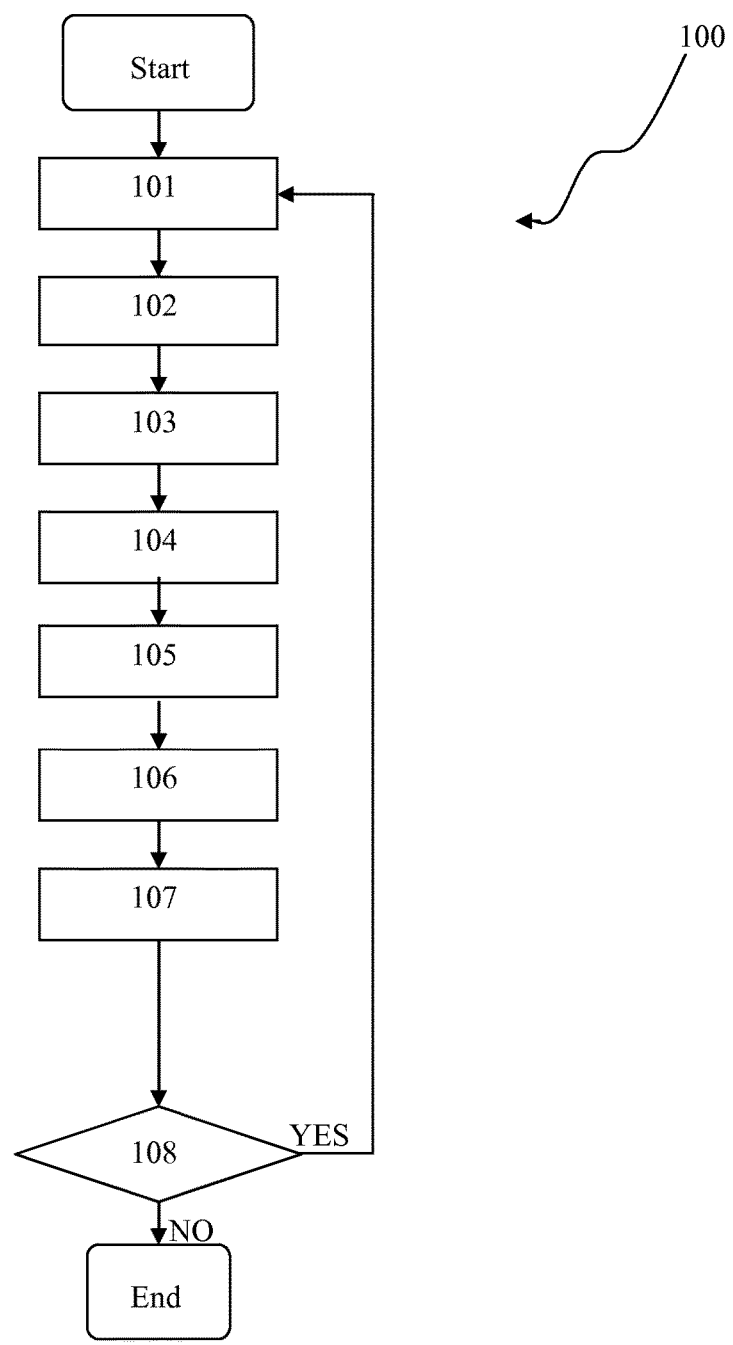
FIG. 2 is the flowchart of the preferred method of the present invention.

The components illustrated in the figures are individually referenced where the numbers and letters refer to the following:

1. System for measuring tracker accuracy
2. Reference camera
3. Calibration pattern
4. Camera spatial relation computation unit
5. Relative spatial relation computation unit
6. Spatial relation comparison unit
7. Memory unit
O. Tracked object
S. Tracker system
T. Tracker camera

100. Method for measuring tracker system accuracy

A system for measuring tracker system accuracy (1) fundamentally comprises;
- at least one reference camera (2) configured to acquire at least one electronic pixel image of at least one tracked object (0) having a tracking pattern and being tracked by a tracker camera (T),
- at least one calibration pattern (3) which is visible by reference camera (2),
- at least one camera spatial relation computation unit (4) which is connected to at least one camera and configured to compute spatial relation between an object having a tracking pattern and a camera using the object's electronic pixel image acquired by these cameras,
- at least one relative spatial relation computation unit (5) which is connected to the camera spatial relation computation unit (4) and configured to compute spatial relation between at least two identities, given the spatial relation of all these identities with respect to a reference frame,
- at least one memory unit (7) configured to store at least one accuracy value,
- at least one spatial relation comparison unit (6) which is connected to camera spatial relative spatial relation computation unit (5), tracker system (S) and memory unit (7), and configured to compare the tracker system's (S) tracker camera (T)—tracked object (0) relation results with a given ground truth, finding an accuracy value.

In a preferred embodiment of the present invention, reference camera (2) is a camera of the same type as the tracker camera (T) of the tracker system (S). For example if the tracker camera (T) is an infrared vision camera tracking a LED pattern, the reference camera (2) is also an infrared vision camera.

In a preferred embodiment of the present invention, calibration pattern (3) is also visible by the tracker camera (T) to be able to determine reference camera's (2) spatial relation with respect to the tracker camera (T), without using any external tool. This is realized by calculating spatial relation of the reference camera (2) with respect to the calibration pattern (3) and calculating spatial relation of the tracker camera (T) with respect to the calibration pattern using camera spatial relation computation unit (4). Then using the relative spatial relation computation unit (5), reference camera's (2) spatial relation with respect to the tracker camera (T) is established with the required transformation calculations. Therefore, in this embodiment, reference camera (2) and tracker camera (T) of the tracker system (S), for which the accuracy measurement will be made, are connected to the camera spatial relation computation unit (4). This means that, the camera spatial relation computation unit (4) should be compatible and connectible with tracker camera (T) under consideration and is configured to determine spatial relation of the tracker camera (T) and reference camera (2) with respect to the calibration pattern (3). Relative spatial relation computation unit (5) on the other hand, is configured to determine the relation of the reference camera (2) to the tracker camera (T) using their relation information with the calibration pattern (3).

Preferentially, calibration pattern (3) is a checker pattern or a pattern composed of ellipses since corners or blobs can be located very accurately in the captured image, knowing that the pattern is on a smooth planer surface. Also, it is mountable on the tracked object (O) with a known spatial relation with the object (O) which was previously measured by CMM (coordinate measuring machine), laser scanning systems or any other accurate method. Such an embodiment makes the spatial relation between tracked object (O) and calibration pattern (3) readily known as the calibration pattern (3) is mounted on the object (O). In another embodiment, similarly, reference camera (2) is mounted on a place with a known relation with the tracker camera (T) and relation between reference camera (2) and tracker camera (T) becomes apparent without any calculations.

Knowing the spatial relation between tracked object (O) and calibration pattern (3); reference camera (2) and tracker camera (T); and reference camera (2) and calibration pattern (3); it is possible to determine tracked object's (O) relation with the tracker camera (T) from the reference camera (2) viewpoint, using relative spatial relation computation unit (5). This relation data actually provides a ground truth for the object's (O) relation with the tracker camera (T) and can be safely used to determine tracker system (S) accuracy.

In another preferred embodiment, spatial relation comparison unit (6) is configured to compare the tracker system's (S) spatial relation results with the ground truth calculated by relative spatial relation computation unit (5) and record the accuracy result in memory unit (7).

In yet another preferred embodiment of the invention, both calibration pattern (3) and tracked object (O) are visible by the tracker camera (T) and reference camera (2) is not necessary. Reference camera (2) is only included in the other embodiment to calculate accuracy for a different pose of the tracked object (O). If tracker Camera (T) can see the calibration pattern (3) and tracked object (O) for all locations of the tracked object (O), system can work by using the tracker Camera (T) as a Reference Camera. In this situation, there is no need to calculate the relation between reference camera (2) and tracker Camera (T) and still the same calculations are possible. In this case, relative spatial relation computation unit (5) is configured to determine tracked object's (O) ground truth relation with the tracker camera (T) from the tracker camera (T) viewpoint, using the spatial relation between tracked object (O) and calibration pattern (3); and tracker camera (T) and calibration pattern (3).

A method for measuring tracker system accuracy (100) fundamentally comprises the following steps,
- computing spatial relation between a tracked object (O) and a calibration pattern (3) (101),
- computing spatial relation between a reference camera (2) and a tracker camera (T) (102),
- computing spatial relation between a reference camera (2) and a calibration pattern (3) using camera spatial relation computation unit (4) (103),
- computing a ground truth spatial relation between the tracker camera (T) and the tracked object (O) with the data from previous steps (104) and using relative spatial relation computation unit (5),
- obtaining tracker system (S) results giving the spatial relation between the tracker camera (T) and the tracked object (O) (105),
- comparing tracker system (S) results with the calculated ground truth relations and computing accuracy of the tracker system (S) using spatial relation comparison unit (6) (106),
- recording accuracy results for the current pose of the tracked object (O) to memory unit (7) (107), and
- is a new calculation required? (108).

First, spatial relation between a tracked object (O) and a calibration pattern (3) (101) is calculated by any known means of calculation. For example by a CMM, laser system. In a preferred configuration, these computations are done using CMM measurements. Spatial relation between a reference camera (2) and a tracker camera (T) (102) is also calculated by any known means of calculation. Camera spatial relation computation unit (4) and relative spatial relation computation unit (5) is used in preferred configuration.

Then the spatial relation between a reference camera (2) and a calibration pattern (3) is calculated using camera spatial relation computation unit (4) (103). In the following step, tracked object's (O) relation with the tracker camera (T) from the reference camera (2) viewpoint is determined using relative spatial relation computation unit (5) using the spatial relation between tracked object (O) and calibration pattern (3); reference camera (2) and tracker camera (T); and reference camera (2) and calibration pattern (3). All these three relations were found in steps (101), (102) and (103). The relation between tracked object (O) and tracker camera (T) from the reference camera (2) viewpoint actually provides a ground truth and can be safely used to determine tracker system (S) accuracy.

After step (104), tracker system (S) results, giving the spatial relation between the tracker camera (T) and the tracked object (O), are directly received from the tracker system (S) as is (105). These data will be the original data to measure accuracy and these are compared with the ground truth relations found in the previous steps and accuracy of the tracker system (S) is calculated using spatial relation comparison unit (6) (106). Finally, the accuracy results for the current pose of the tracked object (O) are recorded to memory unit (7) (107).

In order to record accuracy measurements for different poses of the tracked object (O), a new calculation required? (108) check is done after step (107) and all the calculations are done and recorded for the new pose of the object (O) starting from step (101). This may be required since the accuracy of the tracker system (S) may be different for different poses of the object (O) and different accuracy values for different poses may be required. If no new calculation is required, then the method ends. Additionally, step (101) becomes unnecessary when spatial relation between tracked object (O) and a calibration pattern (3) is previously known as in the case where calibration pattern (3) is mounted on the tracked object (O) and a CMM measurement is made for that reference camera (2) position. Step (102) also becomes unnecessary when spatial relation between reference camera (2) and tracker camera (T) is previously known and they are stationary. Therefore steps (101) and (102) are practiced only when the respective relation is not previously known. For example for a specific tracker system (S), a setting with a calibration pattern (3) mounted on a tracked object (O) and with a fixed reference camera (2), steps (101) and (102) will only be performed once.

The method (100) together with the system (1) can simply and effectively measure a camera based tracker system's accuracy by calculating a ground truth relation between the tracked object (O) and the tracker camera (T).

Within the scope of these basic concepts, it is possible to develop a wide variety of embodiments of the inventive "system and method for measuring tracker system accuracy" (1), (100). The invention cannot be limited to the examples described herein; it is essentially according to the claims.

The invention claimed is:

1. A system for measuring tracker system accuracy, that exploits CMM in computing relative pose of calibration patterns with tracked objects comprising:

at least one camera spatial relation computation unit which is connected to at least one camera and configured to compute spatial relation between an object having a tracking pattern and a camera using the object's electronic pixel image acquired by these cameras, at least one spatial relation computation unit, that computes the pose of the tracked object with respect to a pre-defined coordinate system using camera spatial relation computation unit, at least one reference camera configured to acquire at least one electronic pixel image of a calibration pattern mounted on at least one tracked object and one tracked object, being tracked by a tracker camera, at least one calibration pattern which is visible by reference camera, for which the spatial relation with respect to tracked object is measured with a CMM, at least one ground truth pose value computed via the calibration pattern and the aforementioned CMM measurements, at least one memory unit configured to store at least one ground truth pose value and accuracy value, at least one spatial relation comparison unit configured to compare the tracker system's results with a given ground truth, finding an accuracy value;

wherein the relative spatial relation computation unit which is configured to determine tracked object's ground truth relation with the tracker camera from the reference camera viewpoint, using the spatial relation between tracked object and the calibration pattern; the reference camera and the tracker camera; and the reference camera and the calibration pattern.

2. The system for measuring tracker system accuracy according to claim 1, wherein a calibration pattern which is visible by the tracker camera and for which CMM is utilized to measure the pose with respect to the tracked object.

3. The system for measuring tracker system accuracy according to claim 2, wherein the relative spatial relation computation unit which is configured to determine tracked object's ground truth relation with the tracker camera from the reference camera viewpoint, using the spatial relation between tracked object and the calibration pattern; the reference camera and the tracker camera; and the reference camera and the calibration pattern.

4. The system for measuring tracker system accuracy according to claim 3, wherein the spatial relation comparison unit which is configured to compare the tracker system's spatial relation results with the ground truth calculated by relative spatial relation computation unit.

5. The system for measuring tracker system accuracy according to claim 4, wherein the calibration pattern which is a pattern composed of ellipses.

6. The system for measuring tracker system accuracy as in claim 5, wherein the calibration pattern which is mounted on the tracked object with a known previously measured spatial relation with the tracked object, measured by the CMM.

7. The system for measuring tracker system accuracy as in claim 4, wherein the calibration pattern which is mounted on the tracked object with a known previously measured spatial relation with the tracked object, measured by the CMM.

8. The system for measuring tracker system accuracy according to claim 3, wherein the calibration pattern which is a pattern composed of ellipses.

9. The system for measuring tracker system accuracy as in claim 8, wherein the calibration pattern which is mounted on the tracked object with a known previously measured spatial relation with the tracked object, measured by the CMM.

10. The system for measuring tracker system accuracy as in claim 3, wherein the calibration pattern which is mounted on the tracked object with a known previously measured spatial relation with the tracked object, measured by the CMM.

11. The system for measuring tracker system accuracy according to claim 2, wherein the calibration pattern which is a pattern composed of ellipses.

12. The system for measuring tracker system accuracy as in claim 11, wherein the calibration pattern which is mounted on the tracked object with a known previously measured spatial relation with the tracked object, measured by the CMM.

13. The system for measuring tracker system accuracy as in claim 2, wherein the calibration pattern which is mounted on the tracked object with a known previously measured spatial relation with the tracked object, measured by the CMM.

14. The system for measuring tracker system accuracy according to claim 1, wherein the spatial relation comparison unit which is configured to compare the tracker system's spatial relation results with the ground truth calculated by relative spatial relation computation unit.

15. The system for measuring tracker system accuracy according to claim 14, wherein the calibration pattern which is a pattern composed of ellipses.

16. The system for measuring tracker system accuracy as in claim 15, wherein the calibration pattern which is mounted on the tracked object with a known previously measured spatial relation with the tracked object, measured by the CMM.

17. The system for measuring tracker system accuracy as in claim 14, wherein the calibration pattern which is mounted on the tracked object with a known previously measured spatial relation with the tracked object, measured by the CMM.

18. The system for measuring tracker system accuracy according to claim 1, wherein the calibration pattern which is a pattern composed of ellipses.

19. The system for measuring tracker system accuracy as in claim 18, wherein the calibration pattern which is mounted on the tracked object with a known previously measured spatial relation with the tracked object, measured by the CMM.

20. The system for measuring tracker system accuracy as in claim 1, wherein the calibration pattern which is mounted on the tracked object with a known previously measured spatial relation with the tracked object, measured by the CMM.

21. The system for measuring tracker system accuracy as in claim 1, wherein the calibration pattern which is mounted on the tracked object with a known previously measured spatial relation with the tracked object, measured by the CMM.

22. A method for measuring tracker system accuracy, which comprises the steps of:
computing spatial relation between a tracked object and a calibration pattern using a CMM,
computing spatial relation between a reference camera and a tracker camera,
computing spatial relation between the reference camera and the calibration pattern using a camera spatial relation computation unit,
computing a ground truth spatial relation between the tracker camera and the tracked object with the data from previous steps and using the relative spatial relation computation unit,
obtaining tracker system results giving the spatial relation between the tracker camera and the tracked object,
comparing tracker system results with the calculated ground truth relations and computing accuracy of the tracker system using spatial relation comparison unit,
recording accuracy results for the current pose of the tracked object to memory unit, and testing if the accuracy results is a new calculation required;
wherein the relative spatial relation computation unit which is configured to determine tracked object's around truth relation with the tracker camera from the reference camera viewpoint, using the spatial relation between tracked object and the calibration pattern; the reference camera and the tracker camera; and the reference camera and the calibration pattern.

* * * * *